(12) United States Patent
Douceur et al.

(10) Patent No.: US 6,304,917 B1
(45) Date of Patent: Oct. 16, 2001

(54) NEGOTIATING OPTIMUM PARAMETERS IN A SYSTEM OF INTERCONNECTED COMPONENTS

(75) Inventors: John R. Douceur, Bellevue; Adam Glass, Kirkland, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/639,289

(22) Filed: Apr. 25, 1996

(51) Int. Cl.$^7$ .................................................. G06F 9/54
(52) U.S. Cl. ............................................................ 709/310
(58) Field of Search ............................ 395/682; 379/88.1; 364/240; 709/310–332; 710/1–21

(56) References Cited

U.S. PATENT DOCUMENTS

| | | | |
|---|---|---|---|
| 5,289,585 | * 2/1994 | Kock et al. | 364/240 |
| 5,606,599 | * 2/1997 | O'Mahony et al. | 379/88.1 |

OTHER PUBLICATIONS

Miller, John A., et al., "The Active KDL object–oriented database system and its application to simulation support," Journal of Object–Oriented Programming, vol. 4, No. 4., pp. 30–44, Aug. 1991.*

* cited by examiner

Primary Examiner—St. John Courtenay, III
(74) Attorney, Agent, or Firm—Lee & Hayes, PLLC (57) ABSTRACT

Components in a system have interconnectable ports, groups of which are to be interconnected. A method of negotiating negotiable parameters between a plurality of the ports includes specifying parameter sets corresponding respectively to the ports. Each parameter set is expressed as a list of constraints on allowable values or ranges of values. When connecting a group of ports, the constraints on their parameter sets are conjoined to form a parameter set intersection. The parameter sets of the ports are then limited to those values included in the parameter set intersection. In addition, parameter sets relating to other ports are potentially limited based on the results of the intersection. The conjoining and limiting steps are repeated until the various parameter sets exhibit no further limitations in response to further repetitions, and this process is repeated for all port interconnections. Subsequently, values for the negotiable parameters are selected from the limited parameter sets.

45 Claims, 3 Drawing Sheets

NEGOTIATING OPTIMUM PARAMETERS IN A SYSTEM OF INTERCONNECTED COMPONENTS

TECHNICAL FIELD

This invention relates to systems of interconnected data or signal processing components and to methods for negotiating or selecting negotiable parameters to be used in interconnecting such components.

BACKGROUND OF THE INVENTION

There are many different types of systems in which signals or data are passed in a directed flow from source components (where the signals or data originate or enter the system), through transfer components (which may modify the signals or data), to sink components (where the signals or data terminate or exit the system). A multimedia computer is an example of such a system. In a multimedia computer, audio and video data might originate from a mass storage system, pass through decompression components, and be supplied to a speaker and a display device.

The invention described below will be used in a system for assembling software components or program modules that pass sampled audio and/or video data in a directed flow. She software components include source, transfer, and sink components. Each software component might be associated with one or more hardware devices and associated device driver programs. The invention could also be used in other contexts, such as in a computer program for simulating or modeling an interconnected system of source, transfer, and sink components.

Figure 1:
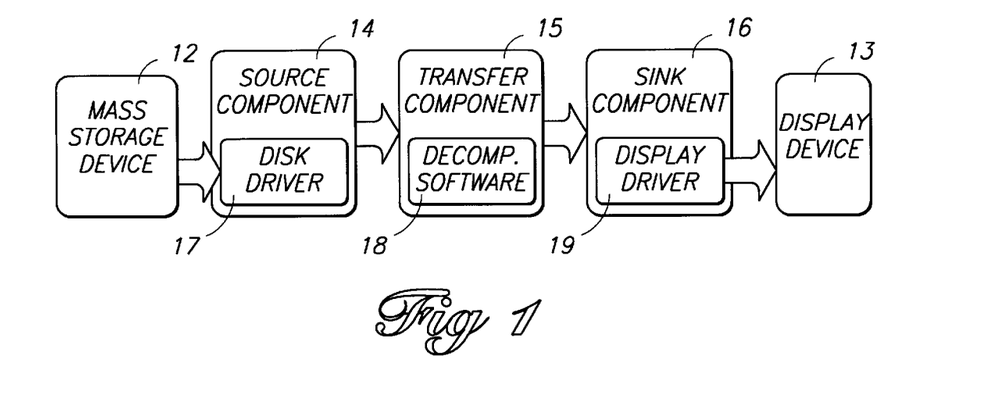
FIG. 1 is a block diagram of an interconnected system of software components such as might be assembled in the context of this invention.

FIG. 1 shows an example of an interconnected system of software components such as might be assembled in the context of this invention. Functionally, the system retrieves a compressed stream of sampled data representing a video segment from a mass storage device 12, decompresses the data, and displays it on a display device 13. In addition to the two physical devices (mass storage device 12 and display device 13), the system includes a source component 14, a transfer component 15, and a sink component 16. Source component 14 is associated with a device driver 17, in this case a hard disk driver, that handles details of communications with mass storage device 12. Source component 14 retrieves data from hard disk 12 at appropriate intervals and prepares or formats the data for subsequent handling by transfer component 15. Transfer component 15 is associated with decompression software 18 for decompressing data into a format suitable for handling by video display hardware. The decompressed data is received by sink component 16, which is associated with a video display driver 19 for transferring the decompressed data to a video display card and associated display device 13.

The component assembly system in which the invention is likely to be used allows a designer (or application program) to specify individual components, along with their individual propagation delays, and one or more direct connections between those components. The components and direct connections are specified one at a time, in an arbitrary sequence.

One issue that needs to be resolved, either by the components themselves or by the component assembly system on behalf of the components, is the format of the data as it is passed from each component to the next. It may be that each component supports a number of different format combinations. However, it will often be the case that the different components do not support the same sets of format combinations.

One way to negotiate format parameters is to allow each connected group of components to negotiate among themselves as they are being connected. In the example of FIG. 1, source component 14 and transfer component 15 would initially negotiate to select an optimum set of format parameters supported by both of the components. Once this connection was completed, transfer component 15 and sink component 16 would negotiate to select another set of format parameters supported by both of these components. In practice, each component would implement a negotiation interface which would be used to actively arbitrate with other components in determining a common communication format.

While this type of negotiation scheme might work in many situations, it does not always result in the optimum overall parameter selection. In this scheme, parameter decisions are made locally as individual components are connected. However, the most efficient parameter selection between two components may not be the most efficient selection when the entire path is considered. For instance, it might be in the example of FIG. 1 that source component 14 and transfer component 15 both support a very efficient data format as well as a slightly less efficient data format, while sink component 16 supports only the less efficient format. Based on the scheme described above, the most efficient format would be chosen for the interconnection between source component 14 and transfer component 15. However, this format would not be available for the interconnection between transfer component 15 and sink component 16, so a format conversion would be required to convert the data to the less efficient format for transfer to sink component 16. In this situation, it would have been more efficient to select the less efficient format for all interconnections, thus avoiding the processing penalty of the format conversion.

In practice, the problem of choosing appropriate or optimum format parameters can become far more complex than indicated by the example of FIG. 1. For example, each component may have multiple input ports and multiple output ports, each of which might be connected to a different component. In addition, a negotiated parameter selection on one port of a component might impose restrictions on the format parameters available at other ports of the same component. Furthermore, there may be a hierarchy of parameter information, such that making one decision in a negotiation not only affects the choices that can be made for other parameters, but even determines which other parameters are relevant to the negotiation.

Even the task of designing negotiation interfaces is problematic. For instance, it is difficult to define interfaces that effectively support radically different classes of communication formats, since each class may require a substantially different form of negotiation. Furthermore, implementation of a negotiation interface requires a high degree of intelligence in each component, thus impeding the automation of the negotiation process. This requirement for component-level intelligence places a significant burden on the implementer of each component. One mechanism that can be employed to case this burden is the creation of generic ports, which are component ports that contain all of the basic logic for both data exchange and parameter negotiation, yet are not specific to any type of component. These generic ports can be instantiated by the component designer and modified as necessary to support the component's negotiation needs. However, since the negotiation interface that each port presents is so heavily dependent upon the classes of communication formats that are supported by the port's component, definition and implementation of generic ports is a difficult problem, and one that has no obvious solution.

It is apparent that the previously proposed methods of negotiating or selecting communication parameters for use among groups of interconnected components have a number of problems. The invention addresses these problems and allows parameters to be selected to provide the optimum overall performance.

SUMMARY OF THE INVENTION

The invention defers the selection of parameters until all relevant information is available. Parameter decisions are made only after all allowable values are known for each component port in light of the specified interconnections between components.

A parameter set is specified for each port. The parameter set indicates the allowable values for each parameter relevant to the communication formats supported by the component for the port. Each parameter set is expressed as a Boolean expression of constraints. A constraint is expressed as a parameter identifier and a value scope. A value scope comprises a list of allowed single values and of allowed ranges of values.

When ports of components are to be interconnected, the constraints on the parameter sets of the ports are conjoined to form a parameter set intersection. The intersection of the parameter sets is made available to each of the components participating in the connection, who may use the information in the intersection to limit the values of the parameter sets on the participating ports or other ports of the components, in order to reflect parameter interdependencies within a port or among the component's ports.

As new port interconnections are made, the parameter sets of the connected ports are intersected and parameter sets within the interconnected components are appropriately limited. After the components limit their parameter sets, the parameter set intersections are recalculated and further limited based on the recalculations. This process is repeated a number of times until further repetitions result in no further limitations of the various parameter sets.

When all interconnections have been made and the parameter sets have converged through cycles of intersection and limitation, values for the negotiable parameters are selected from the final parameter sets. These values are chosen to yield the most efficient overall system rather than to optimize the system on only a local or port-to-port basis.

DETAILED DESCRIPTION OF THE PREFERRED EMBODIMENT

Figure 2:
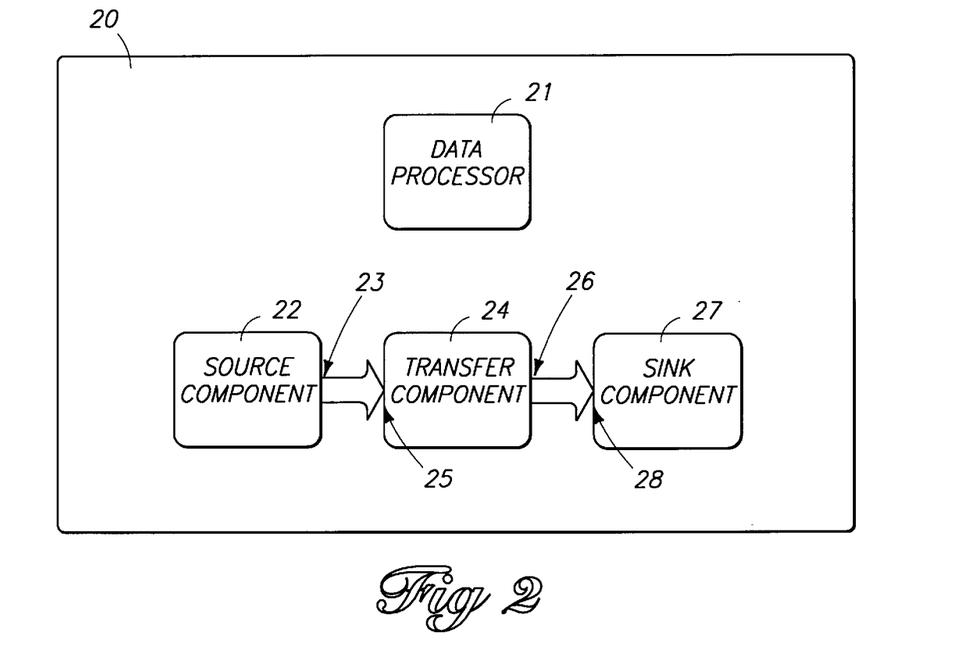
FIG. 2 is a simplified block diagram of a computer system in accordance with a preferred embodiment of the invention.

FIG. 2 shows a computer system 20 in accordance with a preferred embodiment of the invention. The computer system includes a programmable data processor 21 and associated peripherals such as computer-readable storage media, including both electronic memory and mass storage devices. System 20 also includes a component system comprising a plurality of components having interconnectable ports.

Specifically, computer system 20 includes a source component 22 having an output port 23, a transfer component 24 having an input port 25 and an output port 26, and a sink component 27 having an input port 28. Pairs of the ports and their respective components are to be interconnected as shown, with an interconnection between ports 23 and 25 and between ports 26 and 28. While the three-component system shown is adequate for illustrating the invention, the invention can be used in conjunction with any number of interconnected components, each of which can have any number of input and output ports, and each port of which may be connected to any number of other ports.

Each port supports a specific domain of negotiable parameters relating to the formatting or other characteristics of data or control signals that are to be transferred into or out of the port. For instance, a particular negotiable parameter might relate to the allowed speeds of data transmission. Another parameter might relate to the compression protocol used to compress and decompress the data. The object of the parameter-selection process is to select parameters for each interconnection, wherein the selected parameters are supported by all of the ports involved in the interconnection.

Figure 3:
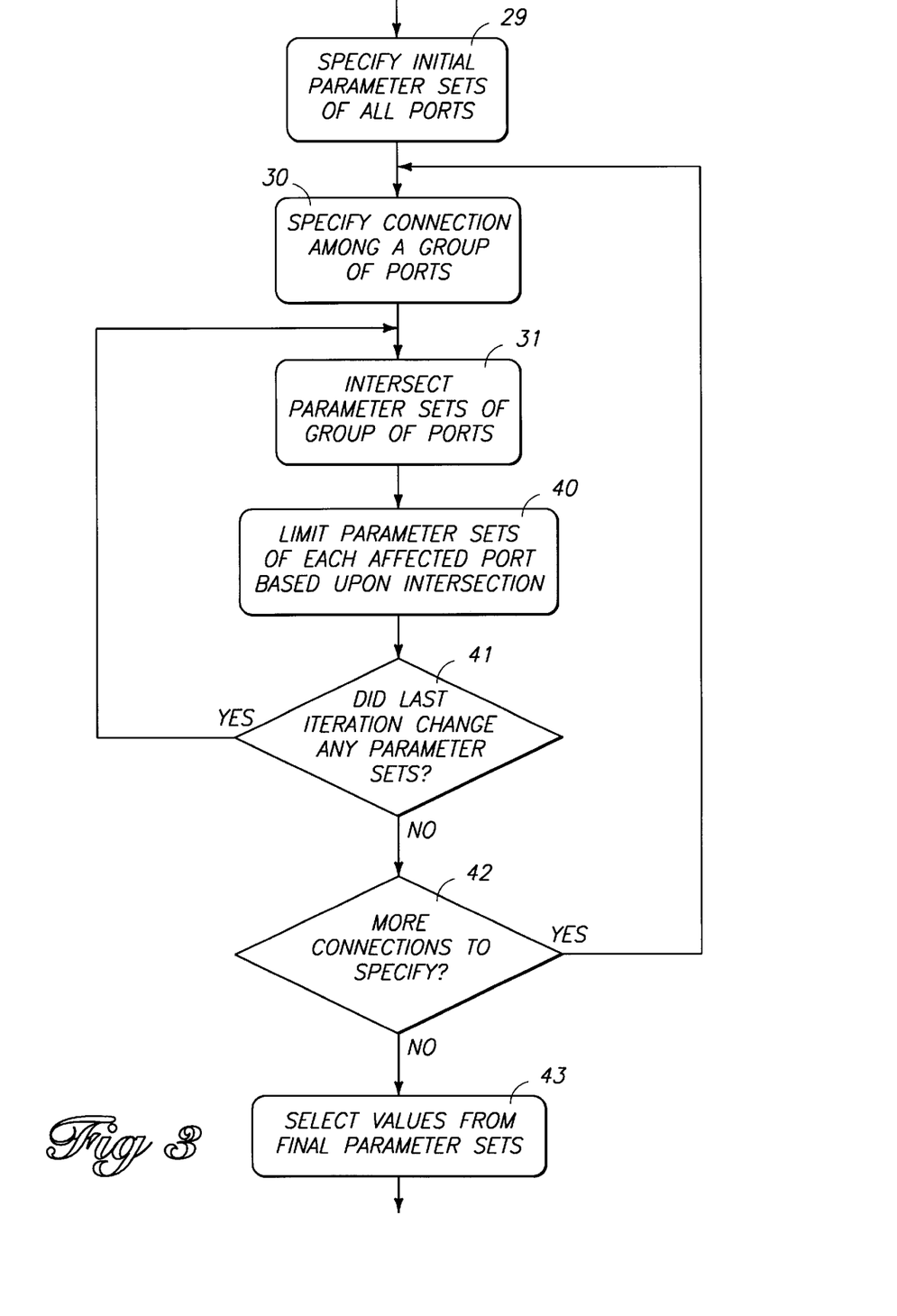
FIG. 3 is a flow chart showing steps in accordance with a preferred embodiment of the invention.

FIG. 3 shows preferred steps in a method of negotiating negotiable parameters among a plurality of the ports. Data processor 21 is programmed to perform the steps discussed, in response to instructions stored on a computer-readable storage media such as electronic memory or a mass storage device. In one embodiment of the invention, a system agent program executes on data processor 21 and performs most of the discussed steps and calculations, while the various components provide information relating to their internal capabilities. Other divisions of responsibility are also possible. For instance, it might be desirable in some situations to assign greater responsibilities to the components themselves.

A first step 29 in accordance with the preferred embodiment of the invention comprises specifying parameter sets corresponding respectively to at least two of the ports. Each parameter set indicates the limited domain of negotiable parameters supported by a component for the corresponding port. In practice, a parameter set is specified for each port.

In the preferred embodiment, the step of specifying a parameter set comprises specifying one or more constraints on negotiable parameter values. Each constraint is specified as a parameter identifier with a corresponding value scope. A value scope is specified as one or more single values and/or as one or more ranges of values. As an example, the following is a symbolic representation of an individual constraint on a parameter value:

MODE={STEREO}

In this example, MODE is a parameter identifier representing a particular negotiable parameter. The curly braces are used to delimit the value scope. Here, STEREO defines a value scope having a single value. This example represents the parameter constraint that MODE must be equal to the value STEREO.

Below is another example of a parameter constraint:

RATE={<10:40>}

In this example, RATE is a parameter identifier representing another negotiable parameter. This parameter can have values in the range of 10 to 40. The values within the angle brackets, separated by a colon, indicate the lower and upper limits of the range. The ranges are specified as open intervals, meaning that they do not include the specified endpoints.

Single values and ranges of values can be combined in a single constraint specification such as the one below:

RATE={10, <30:40>}

This constraint limits RATE to either the exact value 10 or to a value between 30 and 40, excluding the endpoints. In general, each constraint includes a list of values and ranges, separated by commas within curly brackets. Such an expression is a listing of all allowable values for a particular parameter. The commas thus indicate disjunction of the listed values and ranges.

A parameter set is further defined by formulating Boolean expressions of the constraints. For example:

(MODE={STEREO} & RATE={<10:40>})|

(MODE={MONO} & RATE={<10:60>})

where the "&"symbol indicates conjunction, the "|" symbol represents disjunction, and the parentheses indicate order of evaluation. This expression indicates that a port supports data rates in the range of 10 to 40 samples per second when operating in stereo mode, and data rates in the range of 10 to 60 samples per second when operating in monaural mode.

More complicated relationships between parameters can be expressed either explicitly or implicitly. For example, suppose that a parameter X is constrained to be greater than another parameter Y, and both are constrained to be in the range of 0 to 100. The following expression expresses this explicitly, with some loss of usable parameter values due to discretization of intervals:

(X={<1, 100>} & Y={0})|

(X={<26, 100>} & Y={<0, 25>})|

(X={<51, 100>} & Y={<0, 50>})|

(X={<76, 100>} & Y={<0, 75>})|

(X={100} & Y={<0, 99>})

This same relationship could be expressed implicitly by dynamically altering the constraints on the parameters in response to the taking of a set intersection. This process will be described in more detail below. The advantage of this approach is that the relationship is preserved without discretization loss; the disadvantage is that more intelligence is required within the component. The decision of which approach to follow is left to the implementer of the component.

Representing the capabilities of ports in this manner has several advantages.

Parameter information is represented in a very standard fashion; the domain of each parameter is simply a set of parameter values.

Implementation of negotiation interfaces for use between components requires minimal intelligence in each component; all that is needed is for the component to control the relationship between constraints on the parameter sets of its various ports.

Defining a generic port is trivial. The port initially specifies no constraints; once it is connected to another port, its component assigns to its other ports the parameter set from the connected port.

The negotiation process is readily automated. As will be described below, a connecting agent needs only to perform a set intersection in order to determine the set of parameters that are supported by the resulting system of components.

The next step in selecting actual parameter values to be used in interconnections, as indicated by execution block 30 of FIG. 3, is a step of specifying a connection among a group of ports. If connections have been specified prior to beginning the method of the present invention, then this step is equivalent to selecting one of the specified connections. The next step, as indicated by execution block 31 of FIG. 3, is a step of taking the intersection of the parameter sets associated with the ports involved in the interconnection.

Figure 4:
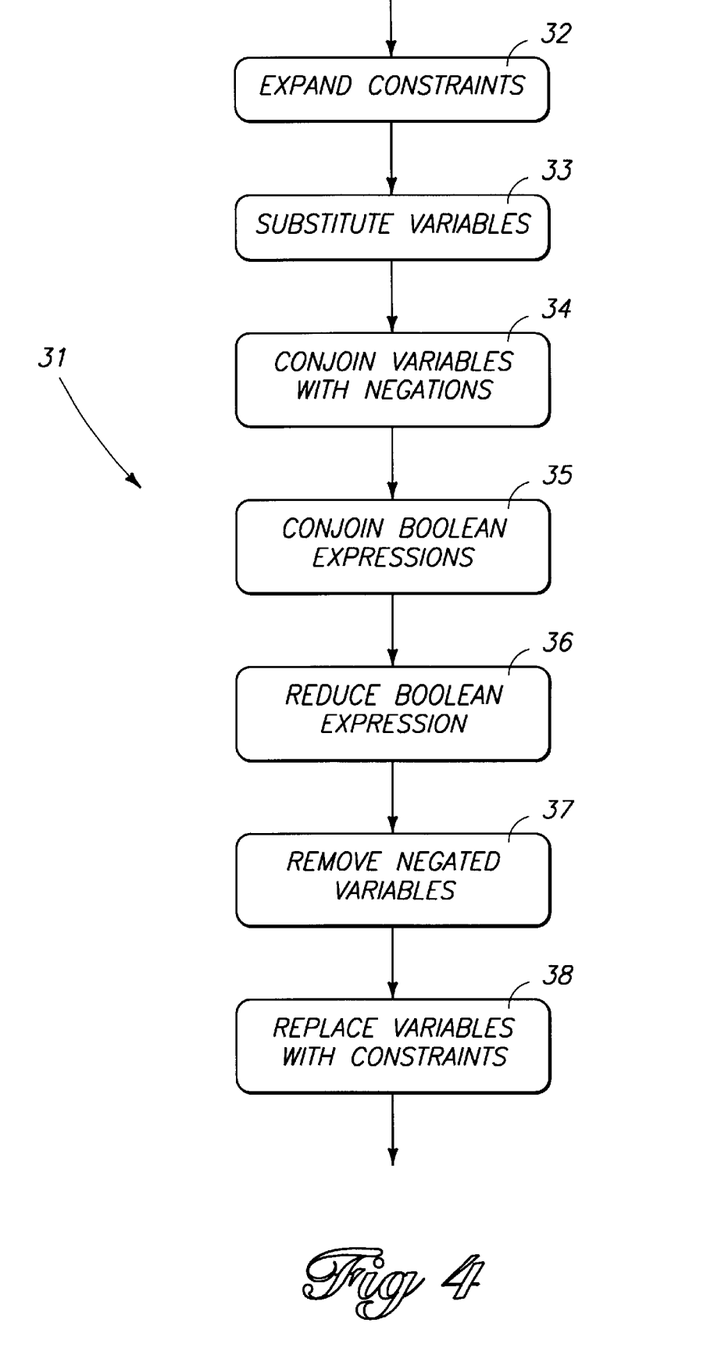
FIG. 4 is a flow chart showing further steps in accordance with the preferred embodiment of the invention.

Intersecting step 31 is performed by conjoining each of the Boolean parameter set expressions as described below with reference to FIG. 4. For purposes of explanation, the parameter set expressions of two ports will be conjoined. The first parameter set is represented as:

A={2, <3:6>}|B={2}

The second parameter set of the example is as follows:

A={<1:4>} & B={2, 5, 10}

The intersection of these sets is (A={2, <3:4>} & B={5, 10})|(A={<1:4>} & B={2})

Intersecting the parameter sets comprises an initial step 32 of logically expanding any constraints in the parameter set expression that relate to a common negotiated parameter into a plurality of constraints that are mutually exclusive. In other words, each parameter set expression is re-written so that no range spans a critical value. A critical value is one which is explicitly enumerated in the expressions for any of the parameter sets being intersected. In the example, the critical values for parameter A are 1, 2, 3, 4, and 6. The critical values for parameter B are 2, 5, and 10. One of the constraints relating to parameter A includes the range <3:6>, which spans the critical value 4 for A. In accordance with step 32, this range is rewritten as:

<3:4>, 4, <4:6>

Recalling that the ranges specify open intervals, the above expression can be seen to include all values which are greater than 3 and less than 4, the exact value 4, and all values which are greater than 4 and less than 6. The constraint specified by this expression is clearly equivalent to that specified by the original expression, namely all values which are greater than 3 and less than 6. The results of rewriting each parameter set so that no range spans a critical value are as follows:

A={2, <3:4>, 4, <4:6>}|B={2} and

A={<1:2>, 2, <2:3>, 3, <3:4>} & B={2, 5, 10}

Step 32 further includes expanding the number of constraints in each of these expressions so that the disjunction of values and ranges is explicit. This results in:

A=2|A=<3:4>|A=4|A=<4:6>|B=2 and (A=<1:2>|A=2|A=<2:3>|A=3|A=<3:4>) &

(B=2|B=5|B=10)

A subsequent step 33 comprises substituting a corresponding variable is symbol for each of the different constraints in each of the resulting expressions. There are 7 different constraints relating to A, so these constraints are replaced with the variables $A_0$ through $A_6$. Similarly, there are three different constraints relating to B, so these constraints are replaced with the variables $B_0$ through $B_2$. Table 1 below shows the substitutions made in the example.

TABLE 1

| Constraint | Variable |
|---|---|
| A = 2 | $A_0$ |
| A = <3:4> | $A_1$ |
| A = 4 | $A_2$ |
| A = <4:6> | $A_3$ |
| A = <1:2> | $A_4$ |
| A = <2:3> | $A_5$ |
| A = 3 | $A_6$ |
| B = 2 | $B_0$ |
| B = 5 | $B_1$ |
| B = 10 | $B_2$ |

These substitutions result in the following Boolean expressions for the example:

$$A_0 | A_1 | A_2 | A_3 | B_0$$

and $$(A_4 | A_0 | A_5 | A_6 | A_1) \ \& \ (B_0 | B_1 | B_2)$$

After the variable substitution, a step 34 is performed of logically conjoining each variable symbol substituted for a constraint that relates to a particular negotiated parameter with the negation of all other variable symbols substituted for constraints relating to the same negotiated parameter. For instance, $A_0$ is conjoined, each time it occurs in one of the above expressions, with the negation of variables $A_1$ through $A_6$ (since each of variables $A_0$ through $A_6$ was substituted for a constraint relating to parameter A). The result of this step, when performed with every variable occurring in each of the expressions, is as follows (in which an exclamation point indicates negation):

($A_0$ & !$A_1$ & !$A_2$ & !$A_3$ & !$A_4$ &!$A_5$ & !$A_6$)|
(!$A_0$ & !$A_1$ &!$A_2$ & !$A_3$ & !$A_4$ & !$A_5$ & !$A_6$)|
(!$A_0$ & !!$A_1$ & $A_2$ & !$A_3$ & !$A_4$ & !$A_5$ & !$A_6$)|
(!$A_0$ & !$A_1$ & !$A_2$ & $A_3$ & !$A_4$ & !$A_5$ & !$A_6$)|
($B_0$ & !$B_1$ & !$B_2$)

and
(
  (!A0 & !A1 & !A2 & !A3 & A4 & !A5 & !A6)|
  (A0 & !A1 & !A2 & !A3 & !A4 & !A5 & !A6)|
  (!A0 & !A1 & !A2 & !A3 & !A4 & A5 & !A6)|
  (!A0 & !A1 & !A2 & !A3 & !A4 & !A5 & A6)|
  (!A0 & A1 & !A2 & !A3 & !A4 & !A5 & !A6)
)&
(
  (B0 & !B1 & !B2)|
  (!B0 & B1 & !B2)|
  (!B0 & !B1 & B2)
)

This step effectively conjoins each constraint relating to a particular negotiated parameter with the negation of all other constraints relating to the same negotiated parameter.

A step 35 is then performed of logically conjoining the manipulated Boolean expressions:

(
  ($A_O$ & !$A_1$ & !$A_2$ & !$A_3$ & !$A_4$ & !$A_5$ & !$A_6$)|
  (!$A_0$ & $A_1$ & !$A_2$ & !$A_3$ & !$A_4$ & !$A_5$ & !$A_6$)|
  (!$A_0$ & !$A_1$ & $A_2$ & !$A_3$ & !$A_4$ & !$A_5$ & !$A_6$)|
  (!$A_0$ & !$A_1$ & !$A_2$ & $A_3$ & !$A_4$ & !$A_5$ & !$A_6$)|
  ($B_0$ & !$B_1$ & !$B_2$)
)&
(
  (!A0 &!A1 & !A2 &!A3 & A4 &!A5 & !A6)|
  (A0 & !A1 & !A2 & !A3 & !A4 & !A5 & !A6)|
  (!A0 & !A1 & !A2 & !A3 & !A4 & A5 & !A6)|

(!A0 & !A1 & !A2 & !A3 & !A4 & !A5 & A6)|
  (!A0 & A1 & !A2 & !A3 & !A4 & !A5 & !A6)
)&
(
  (B0 & !B1 & !B2)|
  (!B0 & B1 & !B2)|
  (!B0 & !B1 & B2)
)

A step 36 is then performed of logically reducing the conjunction of the Boolean expressions resulting from step 35 to a single canonical sum of products expression, yielding ($A_0$ & !$A_1$ & !$A_2$ & !$A_3$ & !$A_4$ & !$A_5$ & !$A_6$ & $B_0$ &!$B_1$ & !$B_2$)|

($A_0$ & !$A_1$ & !$A_2$ & !$A_3$ & !$A_4$ & !$A_5$ & !$A_6$ & !$B_0$ & $B_1$ & !$B_2$)|

($A_0$ & !$A_1$ & !$A_2$ & !$A_3$ & !$A_4$ & !$A_5$ & !$A_6$ & !$B_0$ & !$B_1$ & $B_2$)|

(!$A_0$ & $A_1$ & !$A_2$ & !$A_3$ & !$A_4$ & !$A_5$ & !$A_6$ & $B_0$ & !$B_1$ & !$B_2$)|

(!$A_0$ & $A_1$ & !$A_2$ & !$A_3$ & !$A_4$ & !$A_5$ & !$A_6$ & !$B_0$ & $B_1$ & !$B_2$)|

(!$A_0$ & $A_1$ & !$A_2$ & !$A_3$ & !$A_4$ & !$A_5$ & !$A_6$ & !$B_0$ & !$B_1$ & $B_2$)|

(!$A_0$ & !$A_1$ & $A_2$ & !$A_3$ & $A_4$ & !$A_5$ & !$A_6$ & $B_0$ & !$B_1$ & !$B_2$)|

(!$A_0$ & !$A_1$ & !$A_2$ & !$A_3$ & !$A_4$ & $A_5$ & !$A_6$ & $B_0$ & !$B_1$ & !$B_2$)|

(!$A_0$ & !$A_1$ & !$A_2$& !$A_3$ & !$A_4$ & !$A_5$ & $A_6$ & $B_0$ & !$B_1$ & !$B_2$)|

Step 36 is performed using any standard logic-reduction algorithm, such as the commonly used Quine-McCluskey algorithm.

Subsequent step 37 comprises removing any negated variable symbols from the sum of products expression, resulting in:

($A_0$ & $B_0$)|
($A_0$ & $B_1$)|
($A_0$ & $B_2$)|
($A_1$ & $B_0$)|
($A_1$ & $B_1$)|
($A_1$ & $B_2$)|
($A_4$ & $B_0$)|
($A_5$ & $B_0$)|
($A_6$ & $B_0$)

Step 37 is valid because any negated variable symbol is redundant—the truth of any variable relating to a single negotiable parameter implies the negation of all other variables relating to the same negotiable parameter.

Finally, a step 38 is performed of replacing any remaining variable symbols with the corresponding constraints, effec tively reversing the operation performed in substitution step 33, yielding the following expression:

(A=2 & B=2)|

(A=2 & B=5)|

(A=2 & B=10)|

(A=<3:4> & B=2)|

(A=<3:4> & B=5)|

(A=<3:4> & B=10)|

(B=2 & A=<1:2>)|

(B=2 & A=<2:3>)|

(B=2 & A=3)

This is a correct formulation of the intersection, although it could be reformatted if human readability were a concern.

Once the parameter sets of the ports have been conjoined to find their parameter set intersection in accordance with the steps set forth above, a step 40 (FIG. 3) is performed of limiting the parameter sets of one or more ports of the components being interconnected, based on the results of the conjoining step. At a minimum, the parameter sets of the ports being interconnected are limited to their parameter set intersection. One or more of these sets may also be limited in order to implicitly express an interrelationship among the parameters of the port. For example, a port may explicitly constrain the values of two parameters, X and Y, to be within the range 0 to 100, and it may also require that X be greater than Y. This latter requirement may by expressed implicitly by limiting the range of each parameter in response to any constraints on the other parameter. Suppose that, after the set intersection is taken, parameter X is constrained to be in the range 10 to 40, and parameter Y is constrained to be in the range 25 to 50. The requirement that X be greater than Y can be expressed by limiting the range of X to 26 to 40 and limiting the range of Y to 25 to 39. In further steps described below, it will become clear how repetitions of this process can insure that the constraint is satisfied. In addition, parameter sets of component ports other than those being interconnected might be limited, depending on the characteristics and capabilities of the components. For instance, if a particular port being interconnected has its parameter set limited to a particular data compression format, it might be necessary to limit the parameter sets of other ports of the same component to require that same data compression format. In general, the parameter sets of various ports of a single component are limited to satisfy any dependencies they might have upon another port whose parameter set has been limited.

A further step 41 in accordance with the invention comprises determining whether limiting step 40 caused any changes in the values of parameter sets and, if there were any such changes, repeating steps 31 and 40 on the parameter sets of the affected ports. This repetition continues until no further changes in the values of the parameter sets are made, at which point the parameter sets have converged to stable values. In the above example, the limiting step did affect the values of the parameter sets for parameters X and Y for at least one of the ports, so the intersection of the parameter sets of the interconnection is again taken. Suppose that this intersection produces a constraint range of 26 to 32 for X and a constraint range of 28 to 39 for Y. The limiting step will again insure that X is greater than Y by limiting the range of X to 29 to 32 and the range of Y to 28 to 31. Since this limitation step caused a change in values of the parameter sets, the intersection is taken yet again. Eventually, the process will converge, because the scope of the parameter sets is always reduced on each pass through the loop. At the conclusion of the loop, either a valid range that satisfies all requirements will have been found, or the null set will have been reached, the latter indicating that there does not exist a set of parameters which satisfies all of the constraints in the system.

A further step 42 comprises determining whether there are more connections to specify for the system. If there are more connections to specify, then step 30 is repeated, and the next connection is specified, followed by an iterated repetition of steps 31 and 40 until convergence, as described above. If there are no more connections to specify, then step 43 is performed.

Step 43 comprises selecting values for the negotiable parameters from the parameter set intersections. For a particular group of ports, values are selected from the parameter sets of the ports as limited by the above steps or from the ultimate parameter set intersections corresponding to the interconnection between the ports. However, it is possible after performing the steps described above to select parameters based on the parameter sets of a number of the ports that are to be interconnected, so that an overall optimum parameter combination can be determined. This results from the fact that parameters are not actually selected until the parameter sets for all ports have been appropriately limited. Because of this, it is possible to avoid local connection formats that are detrimental to overall efficiency of the system.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a system of components having interconnectable ports, a method of negotiating negotiable parameters between a plurality of the ports, the method comprising the following steps:

specifying parameter sets corresponding respectively to at least two of the ports, each parameter set indicating a limited domain of the negotiable parameters supported by a component for the corresponding port;

logically intersecting the parameter sets of the ports to form a parameter set intersection;

selecting values for the negotiable parameters from the parameter set intersection.

2. A method as recited in claim 1 wherein the step of specifying parameter sets comprises specifying one or more constraints on negotiable parameter values, and wherein the step of intersecting the parameter sets is performed by logically conjoining the constraints on the negotiable parameter values.

3. A method as recited in claim 2, the step of logically conjoining the constraints on the negotiable parameter values comprising:

specifying each parameter set as a Boolean expression of the constraints; manipulating each Boolean expression as follows:

logically expanding any constraints in the expression that relate to a common negotiated parameter into a plurality of constraints that are mutually exclusive;

logically conjoining each constraint that relates to a particular negotiated parameter with the negation of all other constraints relating to the same negotiated parameter;

logically conjoining the manipulated Boolean expressions;

logically reducing the conjoined Boolean expressions, resulting in a reduced Boolean expression;

removing any redundant constraints from the reduced Boolean expression.

4. A method as recited in claim 3 wherein the step of specifying parameter sets comprises specifying each constraint as a parameter identifier with a corresponding value scope.

5. A method as recited in claim 4 wherein the step of specifying parameter sets further comprises specifying value scopes as single values and as ranges of values.

6. A method as recited in claim 2 wherein the step of specifying parameter sets further comprises specifying each constraint as a parameter identifier with a corresponding value scope.

7. A method as recited in claim 6 wherein the step of specifying parameter sets further comprises specifying value scopes as single values and as ranges of values.

8. A method as recited in claim 2 and further comprising specifying each parameter set as a Boolean expression of the constraints.

9. A method as recited in claim 8 wherein the step of specifying parameter sets further comprises specifying each constraint as a parameter identifier with a corresponding value scope.

10. A method as recited in claim 9 wherein the step of specifying parameter sets further comprises specifying value scopes as single values and as ranges of values.

11. A method as recited in claim 10, the step of logically conjoining the constraints on the negotiable parameter values comprising:

manipulating each Boolean expression as follows:

logically expanding any constraints in the expression that relate to a common negotiated parameter into a plurality of constraints that are mutually exclusive;

substituting a corresponding variable symbol for each of the different constraints in the expression;

logically conjoining each variable symbol substituted for a particular constraint that relates to a particular negotiated parameter with the negation of all other variable symbols substituted for constraints relating to the same negotiated parameter;

logically conjoining the manipulated Boolean expressions;

logically reducing the conjoined Boolean expressions, resulting in a reduced Boolean expression;

removing any negated variable symbols from the reduced Boolean expression;

replacing remaining variable symbols with the corresponding constraints.

12. In a system of components having interconnectable ports, wherein interconnections are to be formed among groups of the ports and their respective components, a method of negotiating negotiable parameters among a plurality of the ports comprising the following steps:

(a) specifying parameter sets corresponding respectively to the ports, each parameter set indicating a limited domain of the negotiable parameters supported by a component for the corresponding port;

(b) logically intersecting the parameter sets supported by a group of components for a group of ports that are to be interconnected;

(c) limiting parameter sets of one or more ports of the group of components based on the results of the intersecting step;

(d) reiterating steps (b) and (c) for different groups of components and ports that are to be interconnected, using the parameter sets corresponding to the individual ports of the groups as limited by any preceding iterations of steps (b) and (c);

(e) selecting values for the negotiable parameters from the parameter sets as limited by steps (b), (c), and (d).

13. A method as recited in claim 12 and further comprising a step of repeating steps (b) and (c) until further repetitions do not further limit the parameter sets.

14. A method as recited in claim 12 wherein the one or more ports recited in step (c) include ports other than the ports that are to be interconnected.

15. A method as recited in claim 12 wherein the step of specifying parameter sets comprises specifying one or more constraints on negotiable parameter values, and wherein the step of intersecting the parameter sets is performed by logically conjoining the constraints on the negotiable parameter values.

16. A method as recited in claim 15, the step of logically conjoining the constraints on the negotiable parameter values comprising:

specifying each parameter set as a Boolean expression of the constraints;

manipulating each Boolean expression as follows:

logically expanding any constraints in the expression that relate to a common negotiated parameter into a plurality of constraints that are mutually exclusive;

logically conjoining each constraint that relates to a particular negotiated parameter with the negation of all other constraints relating to the same negotiated parameter;

logically conjoining the manipulated Boolean expressions;

logically reducing the conjoined Boolean expressions, resulting in a reduced Boolean expression;

removing any redundant constraints from the reduced Boolean expression.

17. A method as recited in claim 16 and further comprising a step of repeating steps (b) and (c) until further repetitions do not further limit the parameter sets.

18. A method as recited in claim 15 wherein the step of specifying parameter sets further comprises specifying each constraint as a parameter identifier with a corresponding value scope.

19. A method as recited in claim 18 wherein the step of specifying parameter sets further comprises specifying value scopes as single values and as ranges of values.

20. A computer system comprising:

at least one programmable data processor;

a plurality of components having interconnectable ports, the components supporting for each port a limited domain of negotiable parameters defined by a parameter set;

said at least one data processor being programmed to perform a step of logically intersecting the parameter sets of at least two ports that are to be interconnected, said intersecting resulting in a parameter set intersection;

said at least one data processor being further programmed to perform an additional step of selecting negotiable parameter values for the interconnection of said at least two ports from the parameter set intersection.

21. A computer system as recited in claim 20, said at least one data processor being further programmed to perform a step of specifying parameter sets of the ports as one or more constraints on negotiable parameter values, and wherein the programmed step of intersecting the parameter sets is performed by logically conjoining the constraints on the negotiable parameter values.

22. A computer system as recited in claim 21, wherein said at least one data processor is further programmed to conjoin the constraints on the negotiable parameter values by performing the following steps:
specifying each parameter set as a Boolean expression of the constraints;
manipulating each Boolean expression as follows:
logically expanding any constraints in the expression that relate to a common negotiated parameter into a plurality of constraints that are mutually exclusive;
logically conjoining each constraint that relates to a particular negotiated parameter with the negation of all other constraints relating to the same negotiated parameter;
logically conjoining the manipulated Boolean expressions;
logically reducing the conjoined Boolean expressions, resulting in a reduced Boolean expression;
removing any redundant constraints from the reduced Boolean expression.

23. A computer system as recited in claim 22 wherein the programmed step of specifying parameter sets includes specifying each constraint as a parameter identifier with a corresponding value scope.

24. A computer system as recited in claim 23 wherein the programmed step of specifying parameter sets further includes specifying value scopes as single values and as ranges of values.

25. A computer system as recited in claim 21 wherein the programmed step of specifying parameter sets includes specifying each constraint as a parameter identifier with a corresponding value scope.

26. A computer system as recited in claim 25 wherein the programmed step of specifying parameter sets further includes specifying value scopes as single values and as ranges of values.

27. A computer system as recited in claim 21, wherein the programmed step of specifying parameter sets includes specifying each parameter set as a Boolean expression of the constraints.

28. A computer system as recited in claim 27 wherein the programmed step of specifying parameter sets further includes specifying each constraint as a parameter identifier with a corresponding value scope.

29. A computer system as recited in claim 28 wherein the programmed step of specifying parameter sets further includes specifying value scopes as single values and as ranges of values.

30. A computer system as recited in claim 29, the programmed step of logically conjoining the constraints on the negotiable parameter values comprising:
manipulating each Boolean expression as follows:
logically expanding any constraints in the expression that relate to a common negotiated parameter into a plurality of constraints that are mutually exclusive;
substituting a corresponding variable symbol for each of the different constraints in the expression;
logically conjoining each variable symbol substituted for a particular constraint that relates to a particular negotiated parameter with the negation of all other variable symbols substituted for constraints relating to the same negotiated parameter;
logically conjoining the manipulated Boolean expressions;
logically reducing the conjoined Boolean expressions, resulting in a reduced Boolean expression;
removing any negated variable symbols from the reduced Boolean expression;
replacing remaining variable symbols with the corresponding constraints.

31. A computer system comprising:
at least one programmable data processor;
a plurality of components having interconnectable ports, each component supporting a limited domain of negotiable parameters for any particular port, said limited domain of negotiable parameters being defined by a parameter set, wherein interconnections are to be formed among groups of the ports and their respective components;
said at least one data processor being programmed to perform the following steps:
(a) logically intersecting the parameter sets supported by a group of components for a group of ports that are to be interconnected;
(b) limiting parameter sets of one or more ports of the group of components based on the results of the conjoining step;
(c) reiterating steps (a) and (b) for different groups of ports that are to be interconnected using the parameter sets corresponding to the individual ports of the groups as limited by any preceding iterations of steps (a) and (b);
(d) selecting values for the negotiable parameters from the parameter sets as limited by steps (a), (b), and (c).

32. A computer system as recited in claim 31 wherein said at least one data processor is further programmed to repeat steps (a) and (b) until further repetitions do not further limit the parameter sets.

33. A computer system as recited in claim 31 wherein the one or more ports recited in step (b) include ports other than the ports that are to be interconnected.

34. A computer system as recited in claim 31 wherein the programmed step of specifying parameter sets comprises specifying one or more constraints on negotiable parameter values, and wherein the programmed step of intersecting the parameter sets is performed by logically conjoining the constraints on the negotiable parameter values.

35. A computer system as recited in claim 34, the programmed step of logically conjoining the constraints on the negotiable parameter values comprising:
specifying each parameter set as a Boolean expression of the constraints;
manipulating each Boolean expression as follows:
logically expanding any constraints in the expression that relate to a common negotiated parameter into a plurality of constraints that are mutually exclusive;
logically conjoining each constraint that relates to a particular negotiated parameter with the negation of all other constraints relating to the same negotiated parameter;
logically conjoining the manipulated Boolean expressions;
logically reducing the conjoined Boolean expressions, resulting in a reduced Boolean expression;
removing any redundant constraints from the reduced Boolean expression.

36. A computer system as recited in claim 35 wherein said at least one data processor is further programmed to repeat steps (a) and (b) until further repetitions do not further limit the parameter sets.

37. A computer system as recited in claim 34 wherein the programmed step of specifying parameter sets further comprises specifying each constraint as a parameter identifier with a corresponding value scope.

38. A computer system as recited in claim 37 wherein the programmed step of specifying parameter sets further comprises specifying value scopes as single values and as ranges of values.

39. A computer-readable storage medium containing instructions that are executable on a computer to perform the following steps for intersecting two or more sets of parameters:

specifying each set of parameters as one or more constraints on the values of the parameters;

logically conjoining the constraints on the parameter values, the logically conjoining comprising:

specifying each parameter set as a Boolean expression of the constraints;

manipulating each Boolean expression as follows:

logically expanding any constraints in the expression that relate to a common parameter into a plurality of constraints that are mutually exclusive;

logically conjoining each constraint that relates to a particular parameter with the negation of all other constraints relating to the same parameter;

logically conjoining the manipulated Boolean expressions;

logically reducing the conjoined Boolean expressions, resulting in a reduced Boolean expression; and removing any redundant constraints from the reduced Boolean expression.

40. A computer-readable storage medium as recited in claim 39, wherein the step of specifying parameter sets comprises specifying each constraint as a parameter identifier with a corresponding value scope.

41. A computer-readable storage medium as recited in claim 40, wherein the step of specifying parameter sets further comprises specifying value scopes as single values and as ranges of values.

42. A computer-readable storage medium containing instructions that are executable on a computer to perform the following steps for intersecting two or more sets of parameters:

specifying each set of parameters as one or more constraints on the values of the parameters;

specifying each constraint as a parameter identifier with a corresponding value scope;

specifying value scopes as single values and as ranges of values; and logically conjoining the constraints on the parameter values.

43. A computer-readable storage medium containing instructions that are executable on a computer to perform the following steps for intersecting two or more sets of parameters:

specifying each set of parameters as one or more constraints on the values of the parameters, each parameter set being specified as a Boolean expression of the constraints;

specifying each constraint as a parameter identifier with a corresponding value scope; and logically conjoining the constraints on the parameter values.

44. A computer-readable storage medium as recited in claim 43, wherein the step of specifying parameter sets further comprises specifying value scopes as single values and as ranges of values.

45. A computer-readable storage medium as recited in claim 44, wherein the conjoining step comprises:

specifying each parameter set as a Boolean expression of the constraints;

manipulating each Boolean expression as follows:

logically expanding any constraints in the expression that relate to a common parameter into a plurality of constraints that are mutually exclusive;

substituting a corresponding variable symbol for each of the different constraints in the expression;

logically conjoining each variable symbol substituted for a particular constraint that relates to a particular parameter with the negation of all other variable symbols substituted for constraints relating to the same parameter;

logically conjoining the manipulated Boolean expressions;

logically reducing the conjoined Boolean expressions, resulting in a reduced Boolean expression;

removing any negated variable symbols from the reduced Boolean expression.

* * * * *

UNITED STATES PATENT AND TRADEMARK OFFICE
CERTIFICATE OF CORRECTION

PATENT NO.    : 6,304,917 B1
DATED         : October 16, 2001
INVENTOR(S)   : John R. Douceur et al.

It is certified that error appears in the above-identified patent and that said Letters Patent is hereby corrected as shown below:

<u>Column 1,</u>
Line 25, replace "She" with -- The --.

<u>Column 3,</u>
Line 43, replace "arc" with -- are --.

Signed and Sealed this

Nineteenth Day of March, 2002

Attest:

JAMES E. ROGAN
Director of the United States Patent and Trademark Office

Attesting Officer